United States Patent [19]
Bolla et al.

[11] Patent Number: 5,412,693
[45] Date of Patent: May 2, 1995

[54] WHOLLY-DIGITAL DEMODULATION SYSTEM FOR QAM SIGNALLING IN LOW CAPACITY LINKS

[75] Inventors: Maurizio Bolla, Milan; Massimo Gelichi, San Piero A Grado; Franco Guglielmi, Milan; Nino Leuratti, Barlassina, all of Italy

[73] Assignee: Alcatel Italia S.p.A., Milan, Italy

[21] Appl. No.: 97,885

[22] Filed: Jul. 27, 1993

[30] Foreign Application Priority Data

Jul. 27, 1992 [IT] Italy ................................ MI92A1820

[51] Int. Cl.$^6$ ..................... H04L 27/14; H04L 27/16; H04L 27/22
[52] U.S. Cl. ................................... 375/326; 329/306; 375/327; 375/344; 375/343
[58] Field of Search ...................... 375/14, 39, 80, 94, 375/96, 97, 81; 329/304, 306

[56] References Cited

U.S. PATENT DOCUMENTS

| | | | |
|---|---|---|---|
| 4,262,360 | 4/1981 | Bigo et al. | 375/39 |
| 4,320,517 | 3/1982 | Godard et al. | 375/14 |
| 4,527,278 | 7/1985 | Deconche et al. | 375/97 |
| 4,737,728 | 4/1988 | Nakamura et al. | 375/39 |
| 4,879,728 | 11/1989 | Tarallo | 375/97 |

FOREIGN PATENT DOCUMENTS 0526836 2/1993 European Pat. Off.

OTHER PUBLICATIONS

Electronics and Communication Journal, vol. 3, No. 6, Dec. 1991, London GB, pp. 291–298—Fines and Aghvami 'Fully digital M-ary PSK and M-ary QAM demodulators for land mobile satellite communications', FIGS. 2, 3, 5.

Primary Examiner—Stephen Chin
Assistant Examiner—Don Vo
Attorney, Agent, or Firm—Ware, Fressola, Van der Sluys & Adolphson

[57] ABSTRACT

The present invention relates to a QAM signal demodulation system able to recover phase and frequency of the carrier and convert the signal to baseband, and to perform these functions when frequency errors are remarkable with respect to the symbol frequency (low capacity links); to reconstruct the synchronism of symbol in order to correctly sampling the analog signal to be processed; to complete the shaping of the signal through a digital filter and to equalize the baseband converted signal (in order to compensate the selective fading effects due to propagation and the linear distortions due to imperfections in the realization of the apparatus). Therefore the system comprises several subsystems devoted to performing the various functions and, in particular, at least a carrier frequency and phase recovery subsystem, a subsystem for reconstructing the synchronism frequency capable of driving the signal sampling circuit, and a subsystem of filters. The present invention is directed to the choice of the particular subsystems used as well as their implementation and interconnections.

15 Claims, 5 Drawing Sheets

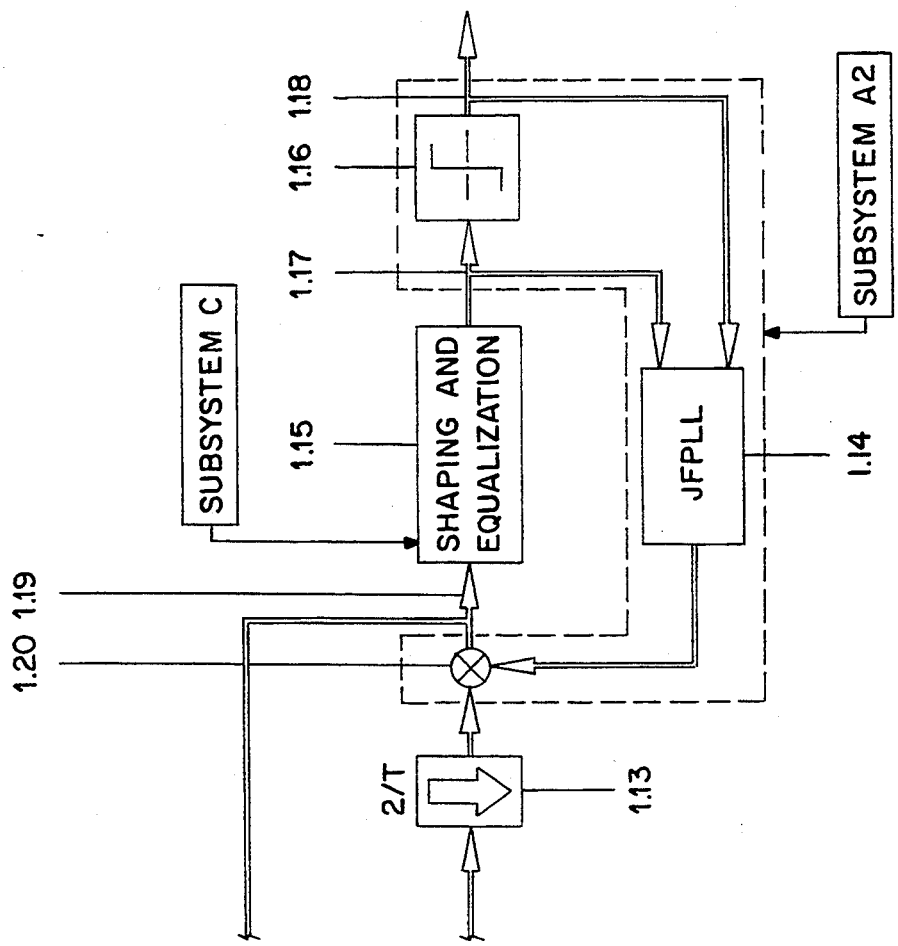

FIG. 3
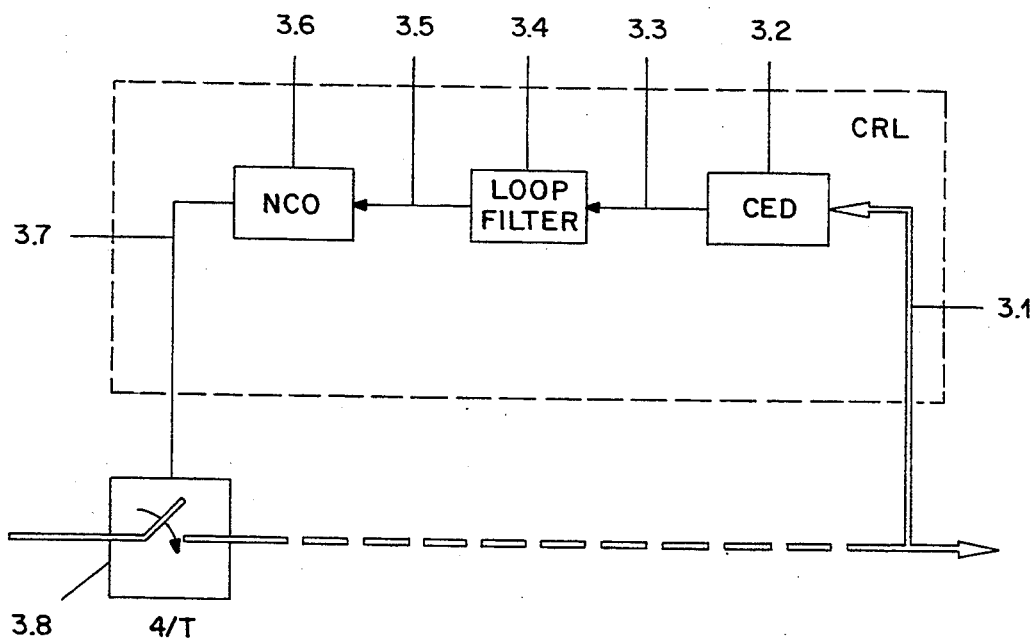
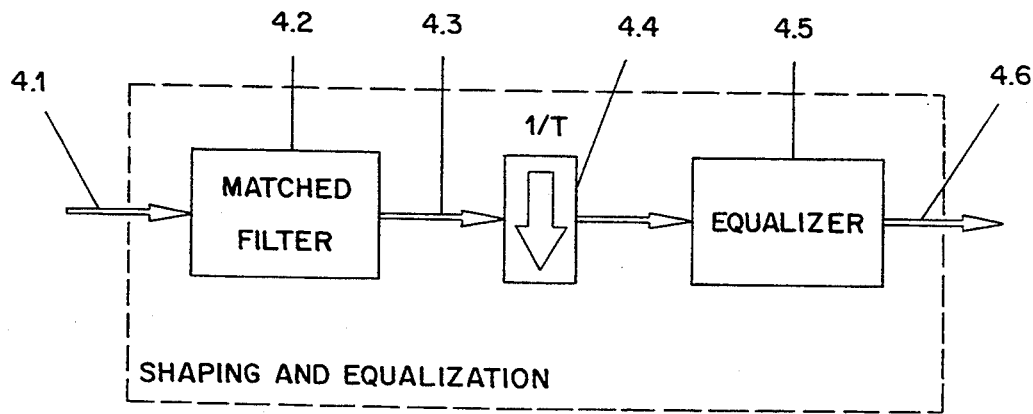
FIG. 4

WHOLLY-DIGITAL DEMODULATION SYSTEM FOR QAM SIGNALLING IN LOW CAPACITY LINKS

TECHNICAL FIELD

The present invention relates to systems for demodulating QAM signals.

BACKGROUND OF THE INVENTION

Typically in coherent-demodulation Systems, e.g. with quadrature amplitude modulation (QAM), local voltage controlled oscillators (VCO's) are used and driven in such a way as to generate an oscillation in phase and frequency coherence with the carrier of the received signal. The possibility of using free local oscillators having a frequency close to the frequency of the carrier would mean a remarkable advantage in terms of cost. However, such oscillators have tolerances different from zero on the nominal frequency and drift both with heat and aging. This requires a device which recognizes the frequency and phase difference between the oscillation generated by the local oscillator and the carrier of the signal and is capable of correcting the effects on the signal to be processed. The devices of this kind (phase and frequency locked loops) are characterized, inter alia, by the lock-in band, i.e. by the amount of frequency errors which they are able to recognize and correct. They belong to two main categories:
- devices that make use of estimates of the received data (having a lock-in band smaller than one-eighth of the symbol frequency);
- devices that do not make use of estimates of the received data (having lock-in bands even greater than the symbol frequency but are sensitive to selective fading).

The problem of tolerance and instability of the free oscillators is difficult to solve for small capacity links for which the symbol frequency is lower and therefore the ratio of the frequency error to the symbol frequency itself is higher.

If, on the other hand, links having capacity increasing gradually are considered, the spectral occupation or the number of modulation levels and hence the sensitivity of the system to selective fading are increased. Consequently the introduction of an adaptive equalizer for counterbalancing the effects becomes necessary. This device constitutes a countermeasure against fading, but at the same time it is able to correct the linear distortions inevitably introduced in the realization of the system because of non-idealness of components. Therefore the introduction of the equalizer makes the system more robust with respect to anomalies in propagation, and also implies a less critical trimming; for this reason an equalizer (even if with few coefficients) is also desirable in the design of a low capacity system.

Moreover, in any demodulation system, it is necessary to insert a device for recovering the clock synchronism phase and frequency. For the correct operation of the system, it is convenient that the algorithm for the clock recovery be independent of the behaviour of devices for carrier recovery and adaptive equalization.

In a digital modem, the clock synchronism is used to drive the signal sampling circuit with a suitable frequency, which is a multiple of the symbol frequency.

It is an object of the present invention to provide a solution for the above-mentioned problems having, inter alia, the advantages mentioned at the outset.

SUMMARY OF THE INVENTION

The present invention is directed to a system for demodulating QAM signals, and specifically such a system that is able to recover carrier phase and frequency and convert the signal to a baseband signal, including when frequency errors are remarkable with respect to the symbol frequency (low capacity links); reconstruct the synchronism frequency in order to correctly sample the analog signal to be processed; complete the shaping of the signal through a digital filter and equalize the baseband converted signal (in order to compensate for the selective fading effects due to propagation and the linear distortions due to imperfections in realizing the apparatus).

Therefore the system is composed of several subsystems devoted to the carrying out of the various functions, (FIG. 1) and in particular to at least:
- A) a subsystem for recovering phase and frequency of the carrier,
- B) a subsystem for reconstructing the synchronism frequency capable of driving the signal sampling circuit, and
- C) a subsystem composed of filters.

The present invention is directed to the choice of particular subsystems used, their implementation and interconnections. The system in accordance with the invention features the following characteristics:
- a) a system for recovering the carrier in turn comprises two subsystems: a quadricorrelator (subsystem A1 in FIG. 1) for recovering the carrier frequency and a loop (subsystem A2 in FIG. 1) for jointly recovering phase and frequency of the carrier that uses the estimated data. The two subsystems are structured as feedback loops.
- b) a subsystem B) that uses the signal at the input of the subsystem C) and includes the circuit (placed upstream of subsystem A1) used for sampling the signal entering the system and converting it into a digital one. Subsystem B) is based on a maximum power algorithm; this implies that its operation is independent of the behaviour of subsystem A) (because the algorithm is insensitive to the phase of the processed signal and therefore to errors in reconstructing phase and frequency of the carrier) and also independent of subsystem C) (because the algorithm does not use the estimated symbols).
- c) a subsystem C) comprises a fixed digital filter which completes the shaping of the transmitted pulse and an adaptive digital equalizer. For both, the structure of Finite Impulse Response (FIR) filters has been chosen because they are particularly easy to implement. The equalizer coefficients are updated through an algorithm insensitive to the phase of the incoming signal so that its convergence is independent of the carrier recovery carried out by subsystem A).

The system according to the invention has at least three basic advantages:
- it is not necessary to use a voltage controlled oscillator (VCO) to carry out the baseband conversion, but a free oscillator is sufficient;
- both the subsystems and their interconnections maintain their operation and effectiveness in a wide range of low/medium capacity links; and single components and the demodulator as a whole are suitable for a wholly digital implementation that minimizes interconnection problems of analog and digital functional blocks; moreover the digital realization along with adaptivity of the subsystems make the trimming of the apparatus much less critical during its production.

BRIEF DESCRIPTION OF THE DRAWINGS

FIG. 1, including FIGS. 1A and 1B, is an overall block diagram of a demodulator according to the present invention. The subsystems referenced are shown by dashed lines.

FIG. 3 is a block diagram of the clock recovery loop (CRL) shown in FIG. 1, including FIGS. 1A and 1B.

FIG. 4 is a block diagram of the shaping and equalization module shown in FIG. 1, including FIGS. 1A and 1B.

BEST MODE FOR CARRYING OUT THE INVENTION

Figure 1A:
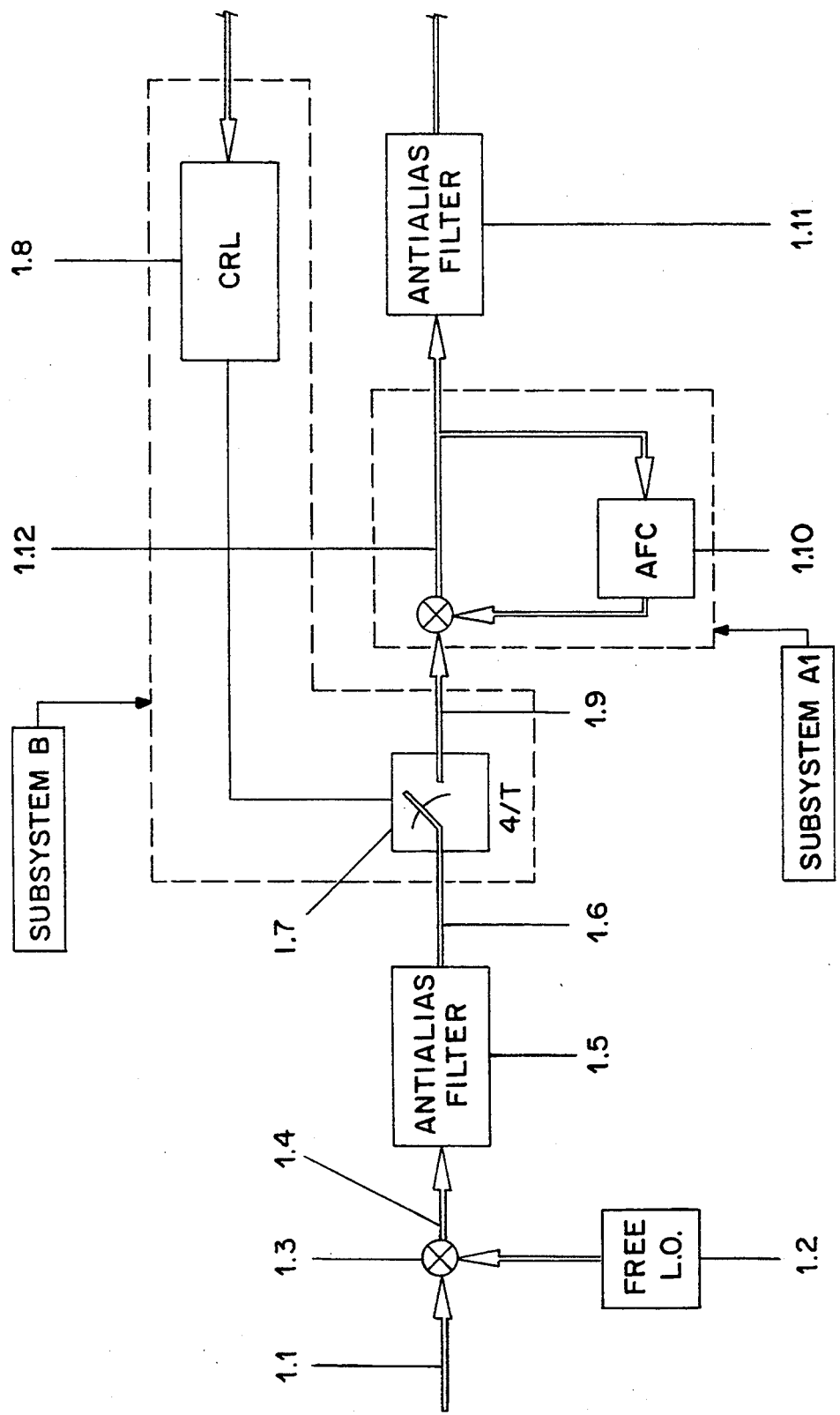

The overall structure of the demodulator is described in the functional block diagram of FIGS. 1A and 1B.

The radio frequency analog signal (1.1) is converted to baseband by multiplication with a sinusoidal oscillation generated by the free local oscillator (1.2) whose tuning frequency is nominally equal to the carrier frequency.

The outgoing complex signal (1.4) from the mixer (1.3) is filtered by anti-aliasing filter (1.5) in such a way as to limit the noise power at the subsequent stages.

Subsequently the analog signal (1.6) is converted into a numeric signal by sampler (1.7) which, on command of the outgoing signal from clock recovery loop (CRL) 1.8, samples the analog signal (1.6) at frequency 4/T, where 1/T is the signalling symbol frequency (subsystem B). This choice of the sampling frequency is related to the frequency errors (introduced on signalling by non-idealness of the free oscillator) which can be tolerated. Said sampling frequency, like others present in the system, is presented as an example only.

The outgoing numeric signal (1.9) from sampler (1.7) is then frequency corrected through the quadricorrelator frequency recovery circuit (Automatic Frequency Control, AFC) (1.10) (Subsystem A1).

Signal (1.12) at the output of the subsystem A1 is filtered by anti-aliasing filter (1.11), is decimated at frequency 2/T in block (1.13) and then is further corrected by digital mixer (1.20) to provide signal (1.19). Mixer (1.20) is part of subsystem A2 and is driven by the joint frequency and phase locked loop (1.14) labelled JFPLL in the figure, which uses the signal (1.17) at the input of the decision element (1.16) and the estimated data (1.18) made available at its output. Signal (1.19) is processed by subsystem C) (1.15), labelled SHAPING AND EQUALIZATION in the figure, to output signal (1.17).

The following is a more detailed description of the automatic frequency control block (the heart of subsystem A1) labelled AFC in the figure, the clock recovery loop block (included in subsystem B), labelled CRL in the figure, the shaping and equalization subsystem C) and the joint frequency and phase locked loop block labelled JFPLL in the figure.

Description of AFC block

Figure 2:
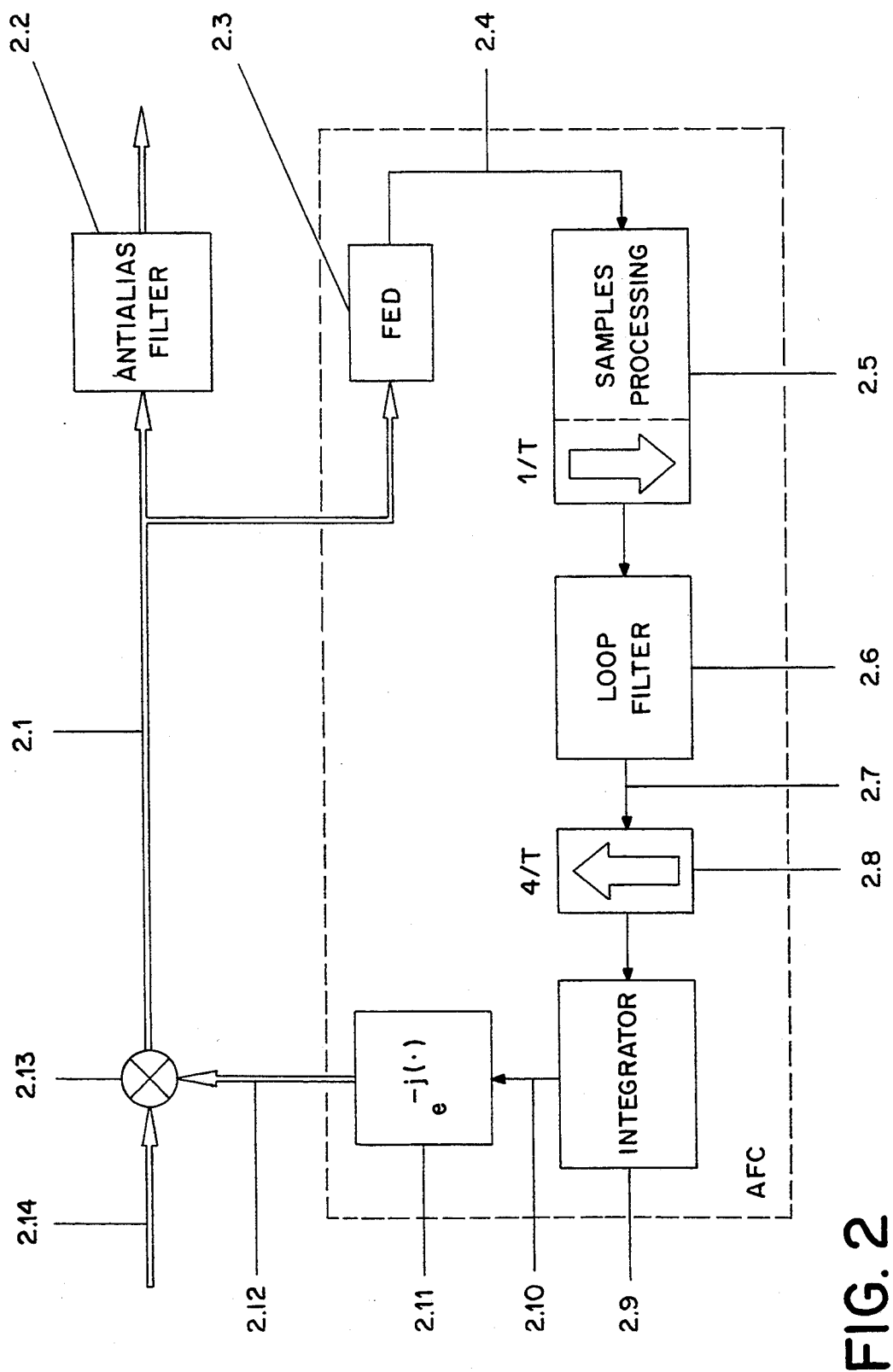
FIG. 2 is a block diagram of the AFC module shown in FIG. 1, including FIGS. 1A and 1B.

AFC indicates the quadricorrelator circuit for recovering the frequency error whose block diagram is illustrated in FIG. 2.

According to one aspect of the invention the system is realized through the use of a feedback loop that estimates and corrects the residual frequency error of the baseband conversion operation by processing the samples of the complex signal (2.1) (coinciding with signal 1.12 of FIG. 1) at the input of the anti-aliasing filter (2.2) (coinciding with block 1.11 in FIG. 1).

In order to obtain such a result the following operations on the signal are necessary:

the samples of the complex signal (2.1) are processed at frequency 4/T by the frequency error detector (2.3) realized with a balanced quadricorrelator (2.3) which outputs a real signal (2.4) proportional to the estimated frequency error;

the samples of the error signal (2.4) from the frequency error detector are averaged in block (2.5) and presented at frequency 1/T to the loop filter (2.6) where they are filtered;

the samples (2.7) from the loop filter (2.6) are read at frequency 4/T by block (2.8) and then integrated (2.9);

the integrator output (2.10) is used for addressing an operator (2.11) that provides the correction complex signal (2.12) to digital mixer (2.13) which processes signal (2.14) (coinciding with signal 1.9 in FIG. 1).

Description of CRL block

Reference CRL (Clock Recovery Loop) indicates the circuit for recovering the synchronism frequency whose block diagram is shown in FIG. 3.

According to one aspect of the invention, the system is realized through a feedback loop. The samples of the complex signals (3.1) at frequency 2/T (coinciding with signal 1.19 of FIGS. 1A and 1B) are processed to provide the signal (3.7) that drives the sampling circuit (3.8) (coinciding with block 1.7 in FIGS. 1A and 1B) at frequency 4/T.

In order to obtain such a result the following operations on the signal are necessary:

the complex signal (3.1) is processed by clock error detector (3.2) according to a maximum power algorithm, that provides the real signal (3.3) proportional to the time reference error;

in the illustrated embodiment, the signal (3.3) is then filtered by the digital loop filter (3.4) whose output (3.5) is used for driving a numerically controlled oscillator (3.6) that outputs the square wave with a frequency of 4/T (3.7) that is applied to a sampler (3.8).

Description of the SHAPING AND EQUALIZATION block

The block labelled SHAPING AND EQUALIZATION performs the shaping of the signal and the adaptive equalization. The block diagram relative to this subsystem C) is represented in FIG. 4.

In this block the complex signal (4.1), coinciding with signal (1.19) in FIGS. 1A and 1B, is at first filtered by the matched filter (4.2) realized through a finite impulse response (FIR) filter. Signal (4.3) is then decimated at frequency 1/T in block (4.4) and hence equalized in block (4.5). The equalizer output signal (4.6) coincides with signal (1.17) in FIGS. 1A and 1B. Also inserted in the equalization block (4.5) is the coefficient updating device that operates in accordance with an algorithm insensitive to phase and frequency of the incoming signal.

Description of JFPLL block

Figure 5:
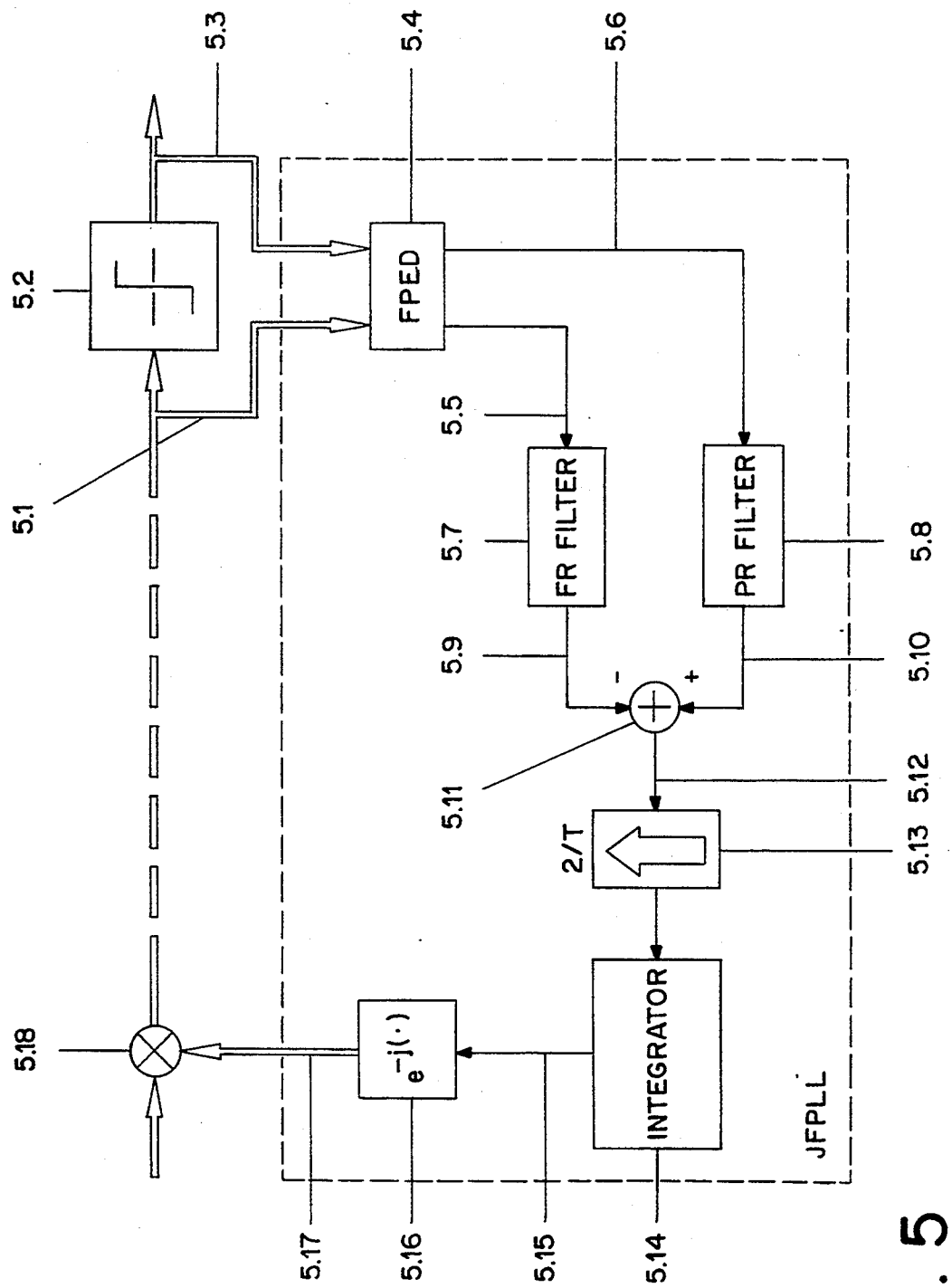
FIG. 5 is a block diagram of the joint frequency and phase locked loop (JFPLL) module shown in FIG. 1, including FIGS. 1A and 1B.

Reference JFPLL (Joint Frequency and Phase Locked Loop) indicates the circuit for recovering both frequency and phase error whose block diagram is illustrated in FIG. 5.

Still, according to one aspect of the invention, the system is realized by a feedback loop which, by suitably processing the samples 5.1 (coinciding with signal 1.18 in FIGS. 1A and 1B), estimates and corrects the residual phase and frequency error of the recovery operation performed by the AFC.

In order to obtain such a result the following operations on the signals are necessary:

the samples of the complex signal (5.1) and the estimates of the complex transmitted data (5.3) are processed at frequency 1/T by the frequency phase error detector (5.4) that outputs two real signals (5.5) and (5.6) respectively proportional to frequency error and phase error;

the samples of signals (5.5) and (5.6) are then filtered respectively by the frequency recovery (FR) filter (5.7) and by the phase recovery (PR) filter (5.8); the outputs (5.9) and (5.10) of such filters are then suitably added in the adder (5.11);

the outgoing samples (5.12) from adder (5.11) are read at frequency 2/T by block (5.13) and then integrated (5.14);

the output (5.15) of the integrator is used for addressing an operator (5.16) that provides the correction complex signal (5.17) to digital mixer (5.18), coinciding with mixer (1.20) of FIGS. 1A and 1B.

Even if the invention has been described with reference to the embodiments represented in the drawings for simplicity and clearness sake, it is susceptible to those variations and replacements which, being within the reach of those skilled in the art, are to be considered as naturally falling within the scope and in the spirit of the present invention.

What is claimed is:

1. A system for demodulating an input signal (1.1) containing numeric signals with quadrature amplitude modulation (QAM) into a demodulated output signal (1.18), comprising:

A) first means (A1 and A2) for recovering a frequency and phase of a carrier signal associated with the input signal (1.1), said first means (A1 and A2) generating a first intermediate signal (1.19) and for generating the demodulated output signal (1.18);

B) a signal sampling circuit (1.7) for sampling the input signal (1.1);

C) second means (B), receiving the first intermediate signal (1.19) of the first means (A1 and A2), for generating a clock recovery control signal (3.7) for controlling the sampling of the signal sampling circuit (1.07); and D) third means (C), receiving the first intermediate signal (1.19), for providing a filtered first intermediate signal (1.17);

characterized in that:

a) the first means (A1 and A2) includes a quadricorrelator carrier frequency recovery (A1) and a second module (A2) for a joint recovery of phase and frequency of the carrier signal which uses the demodulated output signal (1.18);

b) the second means (B) uses the first intermediate signal (1.19) at an input of the third means (C) for generating the clock recovery control signal (3.7) for sampling the input signal (1.1); and c) the third means (C) comprises a fixed digital filter (4.2) which completes a shaping of the demodulated output signal (1.18) and further comprises an adaptive digital equalizer (4.4, 4.5) connected downstream of the fixed digital filter (4.2).

2. A system according to claim 1, further comprising a mixer (1.3) connected to the input signal (1.1) and a signal of a free oscillator (1.2) for conversion of the input signal to a baseband signal (1.4), and supplying said baseband signal to the signal sampling circuit.

3. A system according to claim 1, wherein the first means (A1 and A2) comprises: a joint phase and frequency recovery loop (1.14) that responds to the demodulated output signal (1.18) for generating a phase and frequency recovery signal as the first intermediate signal (1.19).

4. A system according to claim 1, characterized in that the second means (B) reconstructs symbol synchronism by applying a maximum power criterion to the signal supplied to the input of the third means.

5. A system according to claim 1, wherein the third means (C) comprise a shaping FIR filter (4.2) and an equalization adaptive filter (4.5) whose coefficients are updated through a criterion insensitive to the input signal phase.

6. A demodulator for demodulating input signals (1.1) containing numeric signals with quadrature amplitude modulation (QAM) into a demodulated output signal (1.18), comprising:

a clock recovery circuit (subsystem B), responsive to the input signals (1.11), and further responsive to phase lock loop feedback signals (1.19), for providing sampled clock signals (1.9);

a quadricorrelator phase and frequency recovery circuit (subsystem A1), responsive to the sampled clock signals (1.9), for providing phase and frequency recovered sampled signals (1.12);

a shaping and equalization circuit (1.15), responsive to the phase lock loop feedback signals (1.19), for providing shaping and equalization signals (1.17); and a joint frequency and phase lock loop circuit (subsystem A2), responsive to the phase and frequency recovered sampled signals (1.12), and further responsive to shaping and equalization signals (1.17), for providing the phase lock loop feedback signals (1.19), and for further providing the demodulated output signal (1.18).

7. A demodulator according to claim 6, wherein the clock recovery circuit (subsystem B) further comprises:

a clock recovery loop circuit (1.8), responsive to the phase lock loop feedback signals (1.9), for providing clock recovery loop signals; and a sampler circuit (1.7), responsive to the input signals (1.1), and further responsive to the clock recovery loop signals, for providing the sampled clock signals (1.9).

8. A demodulator according to claim 7, wherein the clock recovery loop circuit (1.8) further comprises:
   a clock error detector circuit (CED), responsive to the phase lock loop feedback signals (1.9, 3.1), for providing clock error detector signals (3.3);
   a loop filter circuit (3.4), responsive to clock error detector signals (3.3), for providing loop filter signals (3.5); and
   a numerically controlled oscillator circuit (NCO), responsive to the loop filter signals (3.5), for providing clock recovery loop signals.

9. A demodulator according to claim 6, wherein the quadricorrelator phase and frequency recovery circuit (subsystem A1) further comprises:
   a summing circuit, responsive to the sampled clock signals, and further responsive to automatic frequency control signals, for providing the phase and frequency recovered sampled signals (1.12); and
   an automatic frequency control circuit (AFC), responsive to the phase and frequency recovered signals (1.12), for providing automatic frequency control signals.

10. A demodulator according to claim 9, wherein the automatic frequency control circuit (AFC) further comprises:
    a frequency error detector circuit (2.3), responsive to the phase and frequency recovered signals (1.12), for providing frequency error detector signals (2.4);
    a sample averaging circuit (2.5), responsive to the frequency error detector signals (2.4), for providing sample averaging signals;
    a loop filter sampling circuit (2.6), responsive to the sample averaging signals, for providing loop filter sample signals (2.7);
    a read sample circuit (2.8), responsive to the loop filter sample signals (2.7), for providing read loop filter sample signals;
    an integration circuit (2.9), responsive to the read loop filter sample signals, for providing integrated signals (2.10); and
    a table correction complex circuit (2.11), responsive to integrated signals (2.10), responsive to integrated signals (2.10), for providing table correction complex signals in the form of the automatic frequency control signals.

11. A demodulator according to claim 6, wherein the shaping and equalization circuit (1.15) further comprises
    a matching filter circuit (4.2), responsive to the phase lock loop feedback signals (1.19, 3.1, 4.1), for providing matching filter signals (4.3);
    a decimation circuit (4.4), responsive to the matching filter signals (4.3), for providing decimation signals;
    an equalizer circuit (4.5), responsive to the decimation signals, for providing equalizer signals in the form of shaping and equalizing signals (1.17, 4.6).

12. A demodulator according to claim 6, wherein the joint frequency and phase lock loop circuit (subsystem A2) further comprises:
    a joint frequency and phase lock loop circuit (1.14), responsive to the shaping and equalization signals (1.17), and further responsive to the demodulated output signal (1.18), for providing joint frequency and phase lock loop signals;
    a summing circuit (1.20), responsive to the phase and frequency recovered sampled signals (1.12), and further responsive to the joint frequency and phase lock loop signals, for providing the phase lock loop feedback signals (1.19); and
    a decision circuit (1.16), responsive to the shaping and equalization signals (1.17), for providing the demodulated output signal (1.18).

13. A demodulator according to claim 12, wherein the joint frequency and phase lock loop circuit (1.14) further comprises:
    a frequency phase error detector circuit (5.4), responsive to the demodulated output signal (1.18, 5.3), and further responsive to the shaping and equalizing signals (1.17, 4.6, 5.1), for providing frequency error detector signals (5.5) and for further providing phase error detector signals (5.6);
    a frequency recovery circuit (5.7), responsive to the frequency error detector signals (5.5), for providing the frequency recovery signals (5.9);
    a phase recovery circuit (5.8), responsive to the phase error detector signals (5.6), for providing frequency recovery signals (5.10);
    adder (5.11), responsive to the frequency recovery signals (5.9), and further responsive to the frequency recovery signals (5.10), for providing added frequency and phase recovery signals (5.12);
    a read circuit (5.13), responsive to added frequency and phase recovery signals (5.12), for providing sampled frequency and phase recovery signals;
    an integrator circuit (5.14), responsive to the sampled frequency and phase recovery signals, for providing integrated frequency and phase recovery signals (5.15); and
    frequency and phase table correction circuit (5.16), responsive to the integrated frequency and phase recovery signals (5.15), for providing frequency and phase table correction signals (5.17) in the form of the joint frequency and phase lock loop signals.

14. A demodulator according to claim 6, wherein the system also comprises:
    a free local oscillator (1.2), for providing free local oscillating signals;
    a summing circuit (1.3), responsive to the input signal (1.1) and free local oscillating signals, for providing a mixed input signals (1.4); and
    an antialias filter circuit (1.5), responsive to the mixed input signals (1.4), for providing filtered analog input signals.

15. A demodulator according to claim 6, wherein the system also comprises:
    an antialias filter circuit (1.11), responsive to the phase and frequency recovered signals, for providing filtered phase and frequency recovered signals; and
    a decimator circuit (1.13), responsive to the filtered phase and frequency recovered signals, for providing the phase and frequency recovered sampled signals.

* * * * *